(12) United States Patent
Mazzucato et al.

(10) Patent No.: US 12,257,799 B2
(45) Date of Patent: **\*Mar. 25, 2025**

(54) INSERT FOR A MOULD FOR VULCANISING TYRES FOR VEHICLE WHEELS, PROCESS FOR PRODUCING SAID INSERT AND PROCESS FOR VULCANISING TYRES

(71) Applicant: Pirelli Tyre S.p.A., Milan (IT)

(72) Inventors: Angelo Mazzucato, Milan (IT); Alfredo Balini, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,554

(22) Filed: Apr. 8, 2024

(65) Prior Publication Data

US 2024/0293986 A1    Sep. 5, 2024

Related U.S. Application Data

(63) Continuation of application No. 17/596,222, filed as application No. PCT/IB2020/055072 on May 28, 2020, now Pat. No. 12,005,662.

(30) Foreign Application Priority Data

Jun. 13, 2019    (IT) .................. 102019000008856

(51) Int. Cl.
- *B29D 30/72* (2006.01)
- *B29D 30/06* (2006.01)
- *B60C 13/00* (2006.01)

(52) U.S. Cl.
CPC .......... *B29D 30/72* (2013.01); *B29D 30/0606* (2013.01); *B60C 13/001* (2013.01);
(Continued)

(58) Field of Classification Search
None
See application file for complete search history.

(56) References Cited

U.S. PATENT DOCUMENTS

| 5,263,525 A | 11/1993 | Yamashita |
| 2007/0235890 A1 | 10/2007 | Lewis et al. |

(Continued)

FOREIGN PATENT DOCUMENTS

| CN | 103534107 A | 1/2014 |
| CN | 106457711 A | 2/2017 |

(Continued)

OTHER PUBLICATIONS

International Search Report form the European Patent Office in corresponding International Application No. PCT/IB2020/055072 mailed Sep. 7, 2020.

(Continued)

*Primary Examiner* — Yung-Sheng M Tsui
(74) *Attorney, Agent, or Firm* — Finnegan, Henderson, Farabow, Garrett & Dunner, L.L.P.

(57) ABSTRACT

An insert for a mould for vulcanising tyres for vehicle wheels, the insert arranged to receive in a seat formed on a moulding surface of the mould and comprising a base surface from which a plurality of projections extends; wherein, each projection comprises a lateral surface extending away from the base surface such that the lateral surface defines a tapered profile of the projection away from the base surface, is inclined at an angle between 10° and 25° with respect to a direction perpendicular to the base surface, and has a roughness between 4 and 11 μm.

11 Claims, 2 Drawing Sheets

(52) U.S. Cl.
CPC ............... *B29D 2030/0612* (2013.01); *B29D 2030/0616* (2013.01); *B29D 2030/726* (2013.01)

(56) References Cited

U.S. PATENT DOCUMENTS

| | | |
|---|---|---|
| 2012/0256349 A1 | 10/2012 | Ohara |
| 2014/0166177 A1* | 6/2014 | Muhlhoff ............... B29D 30/72 |
| | | 152/523 |
| 2014/0190608 A1 | 7/2014 | Katsuno et al. |
| 2014/0216622 A1 | 8/2014 | Muhlhoff et al. |
| 2014/0345765 A1 | 11/2014 | Amano |
| 2015/0020939 A1 | 1/2015 | Katsuno et al. |
| 2015/0021813 A1 | 1/2015 | Katsuno et al. |
| 2015/0151459 A1 | 6/2015 | Lewis et al. |
| 2017/0011666 A1* | 1/2017 | Kraus .................. G09F 3/0297 |
| 2017/0015073 A1 | 1/2017 | Ohara |
| 2017/0050473 A1* | 2/2017 | Muhlhoff ............... B60C 13/02 |
| 2017/0080656 A1* | 3/2017 | Muhlhoff ........... B29D 30/0606 |
| 2017/0217113 A1 | 8/2017 | Villeneuve et al. |

FOREIGN PATENT DOCUMENTS

| | | | | |
|---|---|---|---|---|
| CN | 106457928 A | | 2/2017 | |
| DE | 10 2016 215732 A1 | | 3/2018 | |
| EP | 0 522 781 A1 | | 1/1993 | |
| EP | 1055509 A1 | | 11/2000 | |
| EP | 2 700 487 A1 | | 2/2014 | |
| EP | 2 799 250 A1 | | 11/2014 | |
| JP | 2000-142026 A | | 5/2000 | |
| WO | WO-2015058872 A1 | * | 4/2015 | ............. B29D 30/72 |
| WO | WO 2016/0016698 A1 | | 2/2016 | |
| WO | WO-2017174919 A1 | * | 10/2017 | ........... B60C 13/001 |

OTHER PUBLICATIONS

Written Opinion of the International Searching Authority from the European Patent Office in corresponding International Application No. PCT/IB2020/055072 mailed Sep. 7, 2020.

Notification of the First Office Action issued by the China National Intellectual Property Administration on May 18, 2023, in corresponding Application No. CN 202080041731.4 (10 pages).

European Office Action issued by the European Patent Office on Nov. 30, 2023, in corresponding Application No. EP 20 742 904.4 (3 pages).

* cited by examiner

INSERT FOR A MOULD FOR VULCANISING TYRES FOR VEHICLE WHEELS, PROCESS FOR PRODUCING SAID INSERT AND PROCESS FOR VULCANISING TYRES

This application is a continuation of U.S. application Ser. No. 17/596,222, filed Dec. 6, 2021, which is a U.S. National stage filing under 35 U.S.C. § 371 of International Application No. PCT/IB2020/055072, filed on May 28, 2020, which claims the benefit of priority to Italian Patent Application No. 102019000008856, filed on Jun. 13, 2019; the disclosure of each of these applications are each incorporated herein by reference in their entirety.

The present invention relates to a process for producing tyres for vehicle wheels and in particular to the phase of moulding and vulcanising the tyre.

A tyre generally has a carcass structure toroidally shaped about an axis of rotation and comprising at least one carcass ply with terminal edges engaged in respective annular anchoring structures, called bead cores.

In a position radially outside the carcass structure, a belt structure is provided, comprising, in the case of car tyres, at least two radially overlapping strips of rubberised fabric with reinforcement cords, and preferably also a third layer of textile or metal cords, arranged circumferentially (at 0 degrees) at least on the ends of the underlying belt strips, in a radially outer position. A tread band, made of elastomeric material, on which a tread surface intended for contact with the road surface is defined, is applied radially outside the belt structure.

In addition, in a position axially outside the carcass structure, there are applied two sidewalls extended from the tread band to the radially inner ends of the tyre, defined by a layer of rubberised ply (beads) surrounding the bead cores.

The process for producing a tyre generally involves a building phase in which the various components of the same tyre are made and assembled, and a subsequent phase of moulding and vulcanisation of the tyre aimed to define the structure of the tyre and in particular the tread band and sidewalls thereof.

To this end, the built but not yet moulded and vulcanised tyre (so-called "green" tyre) is closed inside a vulcanising mould and subjected for an appropriate period of time to temperature conditions so as to determine the desired degree of cross-linking of the elastomeric material.

In addition, during this step, the green tyre is pressed against the inner surfaces of the vulcanising mould, which are advantageously shaped according to the geometry and configuration to be given to the outer surfaces of the tyre.

In particular, during the moulding step, the shape and arrangement of grooves, notches and blocks provided into the tread surface, collectively referred to as the "tread pattern", are defined, which contribute to a large extent to determining the behaviour of the tyre on different road surfaces.

In addition, on the inner surfaces of the mould portions in contact with the tyre sidewalls (the "sidewall plates" of the mould), alphanumeric characters and/or illustrations are generally formed, which, thanks to the moulding step, remain imprinted on the sidewalls so that users may immediately see important information such as the brand, model, logo, size and performance characteristics of the tyre.

In addition, additional information may also be displayed on the sidewalls of the tyre in coded form, for example in the form of barcodes or matrix codes. The latter, more commonly known as 'QR codes', are also increasingly favoured for the greater amount of information they are able to contain for the same surface area occupied.

In addition, the range of applications that allow them to be read by commonly used portable electronic devices, such as smartphones, has further encouraged the use of this type of code.

The QR codes are formed by a standard size matrix, typically square, within which two pluralities of basic units having different optical properties, usually small squares of contrasting colour (for example black and white, or more generally light and dark), are appropriately arranged. The different optical properties make it possible to identify the type of basic units using an optical reader, which transforms them into binary code and then decodes the information.

The information shown in coded form on the sidewalls of the tyre may include a few dozen descriptive product parameters, such as size, load index, speed index, seasonality and tyre type. This information may also include details relating to the tyre's production date, typically the working week, which, however, needs to be continuously updated. For this reason, forming these codes directly on the inner surface of the sidewall plate of the mould is very expensive.

In order to solve this problem, the code to be moulded on the sidewall of the tyre may be formed on an insert, which is removably engaged into a seat formed in a sidewall plate of the mould. In this case, projections and/or recesses capable of producing corresponding recesses and/or projections on the sidewall surface of the tyre are formed suitably on the surface of the insert intended to come into contact with the green tyre sidewall during the moulding step. The recesses or projections present on the sidewall surface of the tyre reflect light differently from the surface without such projections or recesses, defining a corresponding plurality of portions of the sidewall surface that are lighter or darker than the smooth surface surrounding them.

In this way, an optical reader may recognise lighter and darker areas and associate each of these areas (which, in fact, may be associated with pixels) to a type of basic unit of a QR code.

This solution makes it possible to change the code to be moulded on the sidewall of the tyre by replacing the insert, an operation that is clearly less costly than changing the inner surface of the entire sidewall plate.

Alternatively, in order to reproduce such coded information on the tyre sidewall without affecting the mould, there are also known solutions involving processes in which the tyre sidewall is printed directly or processes in which the sidewall is laser engraved.

The term "roughness" of a surface means the arithmetic mean value of the deviations (considered in absolute value), in terms of distance, of the actual profile of the surface with respect to the mean line. This roughness, also known as "average roughness", has the dimensions of a length and is indicated by Ra.

In the present description and in the accompanying claims, a surface is said to be "substantially continuous" with another surface when any step between one surface and the other is less than 0.3 mm, preferably less than 0.1 mm, and when the width of any gap between one surface and the other is less than 0.05 mm, preferably less than 0.03 mm.

The Applicant preliminarily noted that a QR code formed by a number of projections in relief with respect to the surface of the sidewall of the tyre is more exposed to wear, in particular due to rubbing with bodies outside the tyre, thus increasing the risk of compromising the correct reading of the code.

The Applicant therefore verified that the provision of an insert on whose surface there is formed a plurality of projections defines a corresponding plurality of recesses on the sidewall of the tyre which are less subject to problems with regard to rubbing. Furthermore, the Applicant preliminarily verified that projections with a slightly tapered profile are more easily removable from the mould.

The Applicant therefore noted that the recesses formed on the sidewall of the tyre appear darker than the outer surface of the sidewall, which is substantially smooth and devoid of recesses, since a significant fraction of the light radiation entering the recess is "trapped" inside it, thanks to its subsequent multiple reflections on its inner walls.

In particular, the Applicant determined that, by increasing the roughness of the surface of the internal walls of the recess, the effect of trapping of light radiation is more evident, and therefore the contrast between the brightness of an area corresponding to a recess and that corresponding to the smooth surface of the sidewall (devoid of recesses) is more pronounced.

In this way, an optical reader is able to identify more precisely the small portions of the tyre sidewall surface corresponding to the recesses and those not corresponding to the recesses, thus allowing the matrix, formed of light and dark basic units, which defines the QR code, to be reconstructed correctly.

However, the Applicant noted that the increased roughness of the surface of the inner walls of the recesses may lead to a number of difficulties when the sidewall is detached from the mould. In fact, the elastomeric compound of the sidewall adheres more strongly to the rougher walls, with the consequent possibility of tearing during detachment from the mould. This inconvenience is accentuated by the fact that the size of the space between adjacent recesses may be particularly reduced, less than a tenth of a millimetre.

The Applicant determined that any tearing of elastomeric material between one recess and another, in addition to having a detrimental effect on the quality and appearance of the tyre, may also compromise the correct reading of the QR code.

In addition, the Applicant noted that the "brightness" of the recesses also depends on the inclination of the inner walls with respect to a direction perpendicular to the outer surface of the sidewall. In fact, the less inclined the walls are, the greater the reflection of light entering the recess, with a consequent reduction in contrast between light and dark areas of the QR code.

The Applicant therefore felt that in order to obtain the best results in terms of optical reading accuracy of the QR code and removal of the tyre from the mould, the two parameters of inclination and roughness of the projections formed on the insert had to be suitably balanced.

Lastly, the Applicant found that the desired optimisation of the above-mentioned parameters is achieved by forming, on a base surface of the insert intended to come into contact with the sidewall of the green tyre during the moulding step, a plurality of projections whose lateral surface is inclined at an angle between 10° and 25° with respect to a direction perpendicular to the base surface and has a roughness between 4 and 11 μm.

In particular, in a first aspect, the invention relates to an insert for a mould for vulcanising tyres for vehicle wheels.

Preferably, the insert is arranged to be received in a seat formed on a moulding surface of said mould.

Preferably, the insert comprises a base surface from which a plurality of projections extends.

Preferably, each of said projections comprises a lateral surface extending away from said base surface towards a peak of said projection that is remote from said base surface.

Preferably, said lateral surface defines a tapered profile of said projection away from said base surface.

Preferably, said lateral surface is inclined at an angle of between 10° and 25° with respect to a direction perpendicular to said base surface.

Preferably, said lateral surface has a roughness between 4 and 11 μm.

In a second aspect, the present invention relates to a mould for vulcanising tyres for vehicle wheels, comprising at least one sidewall plate on which a moulding surface is defined which is intended for contacting an external surface of a sidewall of a green tyre, and a removable insert that is arranged to be received in a seat formed on said moulding surface and comprises a base surface intended for contacting a portion of said external surface of the sidewall of the green tyre, said insert being formed according to the above-mentioned first aspect.

Thanks to these features, the image moulded on the tyre shows an excellent contrast between dark areas, formed by the recesses, and light areas, formed by the outer surface of the sidewall devoid of recesses. In fact, the shape and roughness of the walls of the recesses are such that they prevent the reflection outwards of a large part of the light radiation entering the recess, making the recess area particularly dark compared to the area devoid of recesses. At the same time, the recesses are well defined without tears in the elastomeric compound between adjacent recesses caused by the compound adhering to the insert during the removal of the tyre from the mould.

This makes it advantageous to mould on the tyre images formed of basic units (pixels) that are very small and at the same time well defined.

The images obtained with the system of the invention may of course be of any form, and may contain any information, even of alphanumerical nature.

In particular, the high definition and high contrast characteristics of the images obtained make this system especially suitable for obtaining QR code images that may be accurately detected by an optical reader.

In a third aspect, the present invention relates to a process for producing an insert according to the first aspect.

Preferably, said process comprises the step of providing a main body of said insert, and of removing material from said main body by means of laser so as to form a base surface thereon with respect to which a plurality of projections is raised.

Preferably, each of said projections comprises a lateral surface extending away from said base surface towards a peak of said projection that is remote from said base surface, wherein said lateral surface defines a tapered profile of said projection away from said base surface.

Preferably, said lateral surface is inclined at an angle of between 10° and 25° with respect to a direction perpendicular to said base surface.

Preferably, said process comprises a step of treating at least said plurality of projections so as to obtain a roughness of said lateral surface of between 4 and 11 μm.

Thanks to this process, the projections are formed by removing the material surrounding them using the laser ablation technique, which makes it possible to obtain, with good precision, projections with the respective lateral walls inclined appropriately. These projections are then treated to obtain the desired roughness values.

In a fourth aspect, the present invention relates to a process for producing a tyre for vehicle wheels comprising building a green tyre and moulding and vulcanising said green tyre in a mould formed according to the second aspect.

The present invention, in at least one of the above aspects, may have at least one of the additional preferred features described hereinafter.

In one embodiment, said projections are substantially identical to one another.

In a preferred embodiment, said lateral surface is inclined at an angle of between 15° and 25° with respect to said direction perpendicular to said base surface. More preferably, said lateral surface is inclined with an angle between 19° and 21° with respect to a direction perpendicular to said base surface.

Preferably, said lateral surface has a roughness between 4 and 9 µm, more preferably between 5.5 and 8 µm, and even more preferably between 6 and 7 µm.

The features regarding the contrast between dark areas and light areas of the images moulded on the sidewall of the tyre by the insert and, at the same time, the features of removability of the tyre from the mould are furthermore optimised within these ranges of inclination and roughness of the lateral walls of the projections.

Preferably, said base surface has a roughness that is less than the roughness of said lateral surface.

Preferably, said base surface has a roughness of between 4 and 9 µm, more preferably between 4.5 and 7 µm, and even more preferably between 5 and 6 µm. In this way, the reflection of the light radiation at the outer surface of the sidewall of the tyre in the event of contact with the base surface of the insert, and, consequently, the contrast between light areas and dark areas is furthermore increased, thus improving the precision of the optical reading.

In one embodiment, said projections are raised with respect to said base surface by a height of between 0.5 mm and 0.7 mm.

In this way, the corresponding recesses formed on the sidewall of the tyre do not considerably negatively affect the integrity of the sidewall of the tyre, which thus maintains its resistance to stresses and to wear.

Preferably, said projections have a substantially circular cross section.

In this way, each projection has a substantially truncated cone profile, with the base, which is larger, rested on the base surface of the insert, and with a peak, which is slimmer, arranged at a distance from the base surface.

In other embodiments, the projections may have profiles of different shape, for example generally in the form of truncated pyramids.

In one embodiment, said projections have a base which has a diameter of between 0.40 and 0.49 mm, more preferably of approximately 0.45 mm.

In this way, the dark areas of the images formed by the recesses are of sufficiently reduced size to be used as basic elements of an image (pixels), in particular of an image representing a QR code.

In one embodiment, said base surface is substantially continuous with said moulding surface.

In this way, the outer surface of the sidewall moulded by the insert remains substantially continuous with the outer surface of the sidewall moulded by the sidewall plate of the mould, maintaining the profile and curvature thereof, so that the formation of steps at the transition between the two surfaces or the formation of burrs around the base surface due to the infiltration of elastomeric material between the insert and the sidewall plate is avoided on the tyre sidewall.

In one embodiment, said base surface may be at the same level as the moulding surface or may protrude slightly therefrom, up to a maximum of 0.05 mm.

In this case, the information moulded by the insert on the tyre sidewall, for example a QR code, is slightly in low relief with respect to the surface of the side wall. This makes it possible to keep the information moulded on the sidewall in a position in which it is better protected from any rubbing, without, however, having to significantly alter the appearance of the sidewall.

In one embodiment, said plurality of projections is subjected to a sandblasting treatment.

This makes it possible to obtain the desired roughness value of the side walls of the projections obtained at the end of the material removal step by laser ablation.

Moreover, the sandblasting treatment is on the whole cost-effective and makes it possible to "smooth out", to the best possible extent, any irregularities in the lateral surface of the projections, such as points and micro-hooks, which may cling to the elastomeric compound of the tread band during the moulding step, respecting the desired degree of roughness.

In addition, the sandblasting treatment, which necessarily also involves the base surface as well as the projections, increases the contrast between light areas and dark areas of the image moulded by the insert on the tyre sidewall.

In fact, sandblasting exerts a more effective action of smoothing and rounding of the ridges and points on the base surface of the insert, oriented substantially perpendicularly to the trajectory over which the particles are thrown against the insert, while on the lateral surfaces of the projections, inclined with respect to the throw trajectory, this action is less violent, so that the roughness of the lateral surfaces decreases less than the value of the base surface.

As a result, the sidewall surface of the tyre in contact with the base surface is smoother than the lateral surface of the recesses formed on the tyre sidewall by the projections, and this increases the difference between the brightness of the recesses and the brightness of the sidewall surface between the recesses.

Preferably, said sandblasting treatment is carried out using glass microspheres.

The use of this material is suitable for smoothing the micro-points and micro-hooks of the side walls of the projections without being too abrasive.

Preferably, said glass microspheres have a diameter between 20 and 100 µm. In this way, the particles may also effectively reach the spaces between adjacent projections.

Preferably, said glass microspheres are thrown towards at least said plurality of projections from a distance of between 10 and 50 cm.

Preferably, said glass microspheres are thrown towards at least said plurality of projections at a pressure of between 5 and 10 bar.

In one embodiment, a coating layer is applied to at least said plurality of projections.

This offers an alternative way to achieve the desired roughness values of the side walls of the projections. In fact, the coating layer is arranged on the crests and on the valleys of the surfaces in a manner not perfectly homogeneous, making the profile of the surfaces more uniform and thus reducing the roughness value.

In a first preferred embodiment, said coating layer is applied by depositing a composite material formed by polymer particles dispersed in a metal matrix.

Preferably, said metal matrix comprises an alloy of nickel and phosphorus.

Preferably, said polymeric particles are particles based on tetrafluoroethylene.

In a second preferred embodiment, said coating layer is applied by galvanic deposition of metal chrome.

Preferably, this deposition is performed until a coating layer thickness of 5 to 15 µm is achieved.

In a preferred embodiment, said removal of material by laser is carried out using a power between 20 and 60 KW, a frequency between 100 and 300 KHz and a speed between 800 and 1500 mm/s.

By varying the laser operating parameters within these ranges, it is possible to identify the most suitable combination to optimise the ablation of material according to the requirements of dimensional accuracy, roughness and productivity. Preferably, during said removal of material, said laser is directed substantially perpendicularly to said base surface.

The features and advantages of the invention will become clearer from the detailed description of a preferred exemplary embodiment thereof, illustrated by way of indication and in a non-limiting manner with reference to the accompanying drawings, in which.

Figure 1:
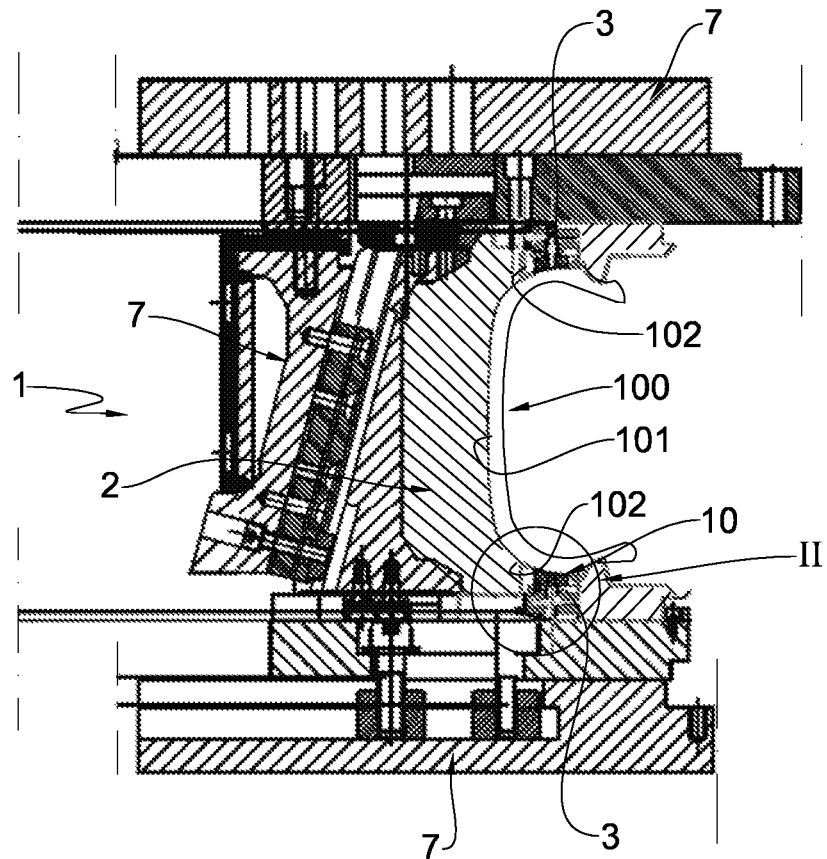
FIG. 1 is a schematic cross-sectional view of a portion of a vulcanising mould for tyres for vehicle wheels, fitted with an insert produced in accordance with the present invention.
Figure 2:
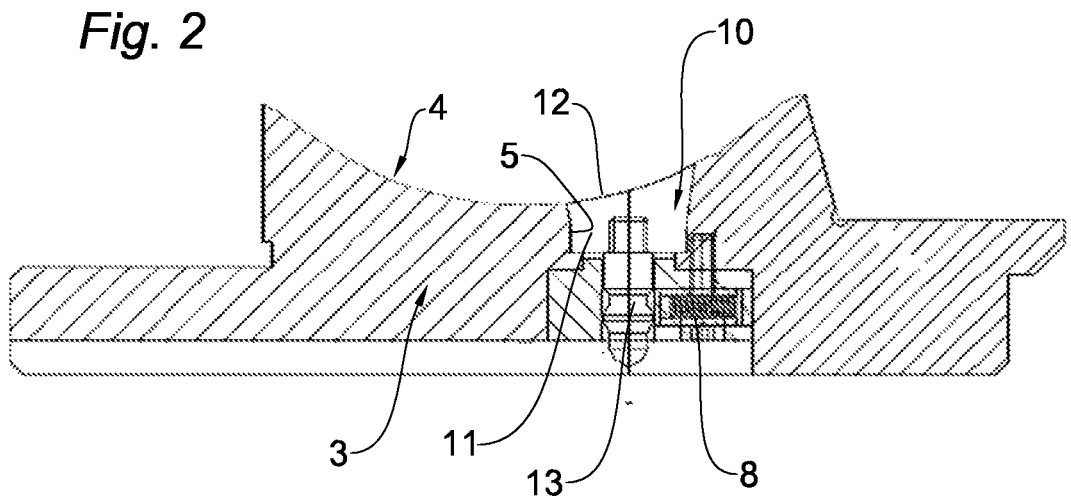
FIG. 2 is a schematic view on an enlarged scale of the portion of the mould denoted by II in FIG. 1.
Figure 3:
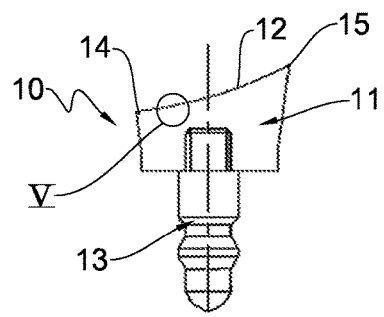
FIG. 3 is a schematic sectional view of the insert of FIG. 2 when decoupled from the mould.

With reference to the accompanying figures, a mould for vulcanising tyres for vehicle wheels produced in accordance with the present invention is denoted overall by 1.

The mould 1 has a conventional overall general structure and comprises a closed moulding chamber in which a green tyre 100 is received for the moulding and vulcanisation process.

The tyre 100 has a generally toroidal shape developed around a rotational axis and comprises a tyre structure that is conventional per se, on which an elastomeric material tread band 101 is arranged in a radially outer position, on which tread band there is defined a tread surface intended for contact with a road surface, as well as a pair of sidewalls 102, extended from the ends of the tread surface towards the rotational axis.

With reference to the radial and axial directions of the tyre 100 when it is received in the mould 1, the moulding chamber is delimited radially by a plurality of heads 2, generally at least 8, which are suitably shaped to form annular sectors and which are intended as a whole to contact the tread band 101, and axially by a pair of sidewall plates 3, which are substantially intended to contact the tyre sidewalls 102. Both the heads 2 and sidewall plates 3 may be moved away from each other to allow the mould to be opened and the green tyre to be inserted into the moulding chamber and removed once it has been moulded and vulcanised.

A heating device 7 is associated with the heads 2 and sidewall plates 3 to transmit to the green tyre the heat necessary to reach the temperature intended for vulcanisation.

Inside the moulding chamber of the mould 1, a membrane, which is conventional per se and not shown in the accompanying figures, may be provided and may be expanded to compress the green tyre 100 against the inner walls of the heads 2 and sidewall plates 3 at a predetermined pressure.

On the inner walls of the mould 1 intended to come into contact with the green tyre, corresponding pluralities of raised portions and recesses are suitably formed so as to obtain, by moulding on the radially outer surface of the tread band 101, the configuration of the tread pattern and, on the sidewalls 102, writing and images useful, for example, for providing visible information to the user regarding the characteristics of the tyre 100.

In particular, on at least one sidewall plate 3, and preferably on both sidewall plates 3, a moulding surface 4 is defined and is intended to contact the outer surface of a tyre sidewall 102.

On the moulding surface 4 of the sidewall plate 3 there is also provided, in a suitable position, a seat 5 to accommodate, with the option of removal, an insert 10.

The insert 10 comprises a main body 11, on which there is defined a base surface 12, turned towards the outside of the sidewall plate 3 when the insert 10 is received in the seat 5, as well as a stem 13 extended from the main body 11, on the opposite side to the base surface 12.

On the sidewall plate 3 there is also provided a locking device 8 to engage the stem 13 and hold the insert 10 firmly engaged in the seat 5.

This locking device may be of the screw type, or snap type, or magnetic type, or it may adopt any other system suitable for holding the insert 10 inside the seat 5 removably.

Preferably, from the main body 11 there is also extended, in an eccentric position, a pin (not shown in the figures) intended to be received in a dedicated recess formed inside the seat 5. The engagement of the pin in the corresponding recess is necessary so that the insert 10 may be fully received in the seat 5 and ensures that the insert 10 is coupled to the seat 5 only with a predetermined orientation.

Preferably, the main body 11 has a profile tapered away from the base surface 12, so as to allow a substantially tight fit with the sidewall plate 3, and so as to prevent, as far as possible, any elastomeric material from entering the seat 5.

As already mentioned, the base surface 12 is arranged inside the moulding chamber and is intended to contact the tyre sidewall 102.

The coupling of the insert 10 in the seat 5 is such that the base surface 12 is substantially continuous with the moulding surface 4 of the sidewall plate 3, without any significant steps at the transition between the two surfaces.

In addition, the base surface 12 has a curved profile, quite similar to the profile of the moulding surface 4, so as to maintain the continuity of the overall surface trend.

The base surface 12, seen from above (FIG. 4), has a generally rectangular form with rounded corners, and on it there are identified an upper edge 14, a lower edge 15, connected to each other by a pair of opposite side edges 16.

In the preferred example described herein, the base surface 12 has a length of approximately 34 mm and a height of approximately 19 mm.

The upper edge 14 is positioned in the seat 5 in a radially outer position, intended to face the tread surface of the tyre 100, while the lower edge 15 is positioned in the seat 5 in a radially inner position, intended to face the ends (the beads) of the tyre 100.

Preferably, to facilitate the insertion of the insert 10 into the seat 5 with the correct orientation, the upper edge 14 is connected to the side edges 16 with a first radius of curvature, while the lower edge 15 has a second radius of curvature, smaller than the first radius of curvature.

In particular, the first radius of curvature is about 7 mm, while the second radius of curvature is about 5 mm.

A substantially square central area 18, with sides of approximately 15 mm, is defined on the base surface, and in said area there is a QR code produced in the ways described hereinafter, surrounded by a framing area 19 of approximately 2 mm, which is substantially smooth, and two opposite lateral areas 17, in which information of alphanumerical nature may be provided.

On the base surface 12, there is formed a plurality of projections 20, extended from the base surface 12 along a direction X substantially perpendicular thereto.

The projections 20 are substantially identical to one another and have a truncated cone profile defined by a lateral surface 21 extended from a base 22, which is part of the base surface 12, towards a peak 23.

The lateral surface 21 is inclined at an angle A of approximately 20° to the direction X and has a roughness Ra between approximately 6 to and approximately 7 μm. Each projection 20 also has a height H of approximately 0.6 mm and a diameter varying between a value D1 of approximately 0.45 mm at the base 22 and a value D2 of approximately 0.1 mm at the peak 23.

The base surface 12 preferably has a roughness lower than the roughness of the lateral surface 21, for example between 5 and 6 μm.

Figure 4:
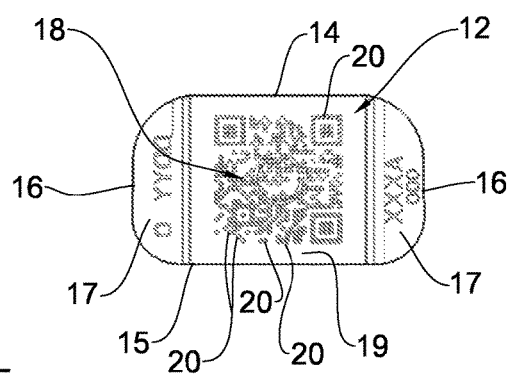
FIG. 4 is a plan view from above of the insert of FIG. 3.
Figure 5:
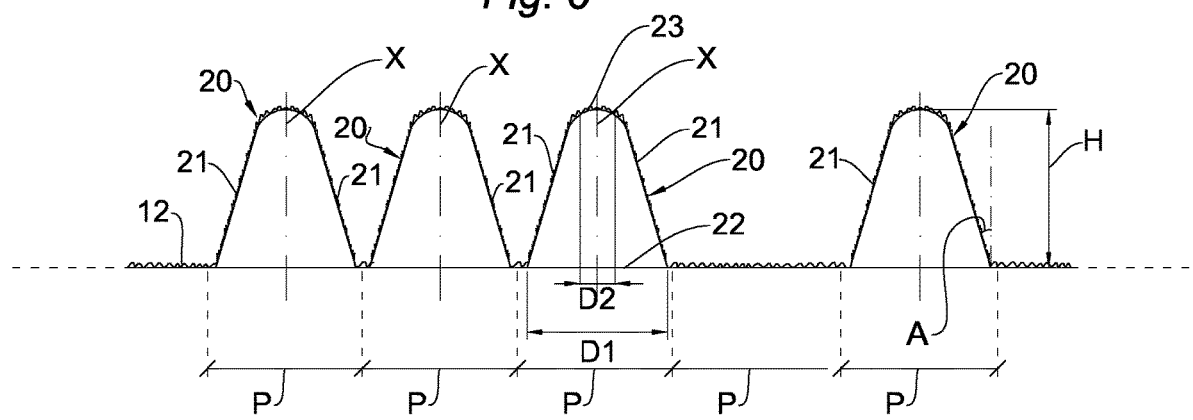
FIG. 5 is a schematic sectional view on a further enlarged scale of a portion of the insert indicated by V in FIG. 3.
Figure 6:
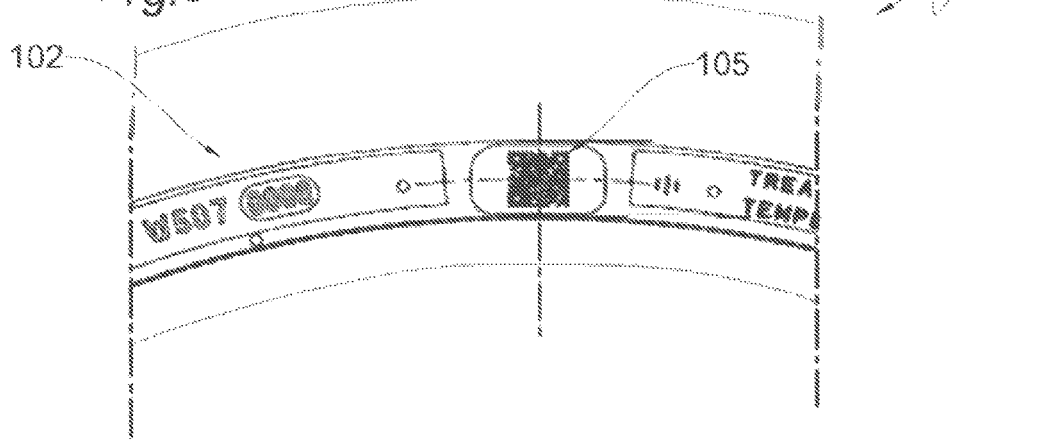
FIG. 6 is a schematic view of a portion of a sidewall of a tyre obtained using the mould of FIG. 1.

The projections 20 are arranged inside the central area 18 according to a predetermined configuration, depending on the coded information contained in the QR code (see FIG. 4, for example). In particular, the central area 18 is subdivided into basic square areas P with a side length of 0.5 mm, and each of these basic areas P comprises a projection 20 which, under consideration of the dimensions of the base 22, occupies the basic area almost fully with a free margin of a few hundredths of a millimetre, or, alternatively, comprises only the base surface 12.

The insert 10 is formed in accordance with one of the processes described below.

On the central body 11, appropriately shaped, there is identified the surface intended to remain turned towards the outside when the insert 10 is received in the seat 5. This surface is then subjected to a treatment of material removal by laser differently in the various areas, so that in some areas the material is removed uniformly, defining the base surface 12, this being substantially smooth, while in other areas the processing is carried out by removing the material present around specific portions of the main body, so as to form the projections 20.

The positioning of the basic areas provided with projections 20 and of the basic areas formed only by the base surface 12 is predetermined depending on the QR code to be moulded on the tyre sidewall 102.

In particular, the laser treatment is carried out maintaining the beam substantially perpendicular to the surface being processed and using a power between 20 and 60 KW, a frequency between 100 and 300 KHz and a speed between 800 and 1500 mm/s.

The laser treatment leaves both the base surface 12 and the peak 23 of the projections 20 with micro grooves, whereas the lateral surface 21 of the projections 20 has a profile with micro steps, which, at the ends, may be hook-shaped.

Such irregularities of the surfaces define their roughness and, in addition, determine the tendency of the elastomeric compound to adhere thereto.

At the end of the material-removal step, the roughness of the surfaces and above all the ability of the elastomeric compound to be removed from the insert without tearing is not yet at the desired levels, and therefore the base surface 12 and its projections 20 are subjected to a further treatment which, in a first preferred embodiment, is a sandblasting treatment.

In particular, the sandblasting is conducted by throwing a jet of glass microspheres with dimensions of between 20 and 100 μm, in the absence of water, from a distance of 10 to 50 cm at a pressure of approximately 5-10 bar.

Following this treatment, the crests of the irregularities of the surfaces are smoothed, and, in particular, any micro hooks and the micro points present on the lateral surfaces 21 of the projections 20 are rounded.

This makes it possible to sensibly increase the ability of the elastomeric compound to be detached from the mould, thus also increasing the difference in roughness between the base surface 12 and lateral surface 21.

In particular, after the sandblasting treatment, the base surface 12 has a roughness between 5 and 6 μm, and the lateral surface 21 has a roughness between 6 and 7 μm.

In a second preferred embodiment, the base surface 12 and the projections 20 thereof, at the end of the laser treatment, are subjected to a coating treatment that involves the application of a coating layer.

In a first exemplary embodiment of the coating treatment, the insert may be treated by depositing, on the base surface 12 and on the projections 20, a composite material formed by particles based on tetrafluoroethylene and dispersed in a matrix based on a nickel-phosphorus alloy.

In particular, the matrix is an alloy formed by 87%-90% nickel and 10-13% phosphorus and contains from 20% to 30% by volume of tetrafluoroethylene particles less than 1 μm in size.

In a second exemplary embodiment, the coating layer, which is about 5-15 μm thick, is applied to the base surface 12 and to the projections 20 by galvanic deposition of metallic chrome.

The insert 10, once prepared, is positioned in the seat 5 and coupled at the stem 13 by the hooking device 8, so as to be firmly held on the sidewall plate 3 and with the base surface 12 substantially aligned with the moulding surface 4.

The correct positioning of the seat 5 is favoured by the different curvature of the connections of the upper and lower edges to the lateral edges and by the provision of the pin.

The vulcanising and moulding process of the tyre 100 is carried out in the usual manner, introducing the green tyre into the moulding chamber, closing the mould 1, expanding the internal membrane, and heating the mould.

During this step, the green tyre sidewall 102 is pressed against the mould surface 4 and the base surface 12 of the insert. In this way, the surface of the sidewall 102 is imprinted with that which is formed in relief on the base surface 12a of the insert. In particular, a QR code 105 is obtained, as in the central area 18 of the insert 10, and is formed by the plurality of recesses corresponding to the projections 20 and by the substantially smooth surface corresponding to the base surface 12 between the projections 20.

Once the vulcanising step is complete, the mould 1 is opened and the moulded and vulcanised tyre 100 is removed.

Thanks to the features of the present invention, the QR code 105 is intact, without any portions of the compound torn between the recesses and with an optimal contrast between dark basic areas and light basic areas, such that the QR code may be read easily and accurately by an optical reader.

The invention claimed is:

1. A process for producing an insert for a mould for vulcanising tyres for vehicle wheels, comprising:
    providing a main body of the insert,
    removing material from the main body by a laser to form a base surface thereon with respect to which a plurality of projections is raised, wherein each of the plurality of projections comprises a lateral surface extending away from the base surface towards a peak of the projection that is remote from the base surface, and wherein the lateral surface defines a tapered profile of the projection away from the base surface, and is inclined at an angle ranging from 10° to 25° with respect to a direction perpendicular to the base surface, and
    treating the plurality of projections to obtain a roughness of the lateral surface ranging from 4 µm to 11 µm.

2. The process according to claim 1, wherein treating the plurality of projections comprises sandblasting.

3. The process according to claim 2, wherein sandblasting comprises using glass microspheres and wherein each glass microsphere has a diameter of ranging from 20 µm to 100 µm.

4. The process according to claim 1, further comprising applying a coating layer to the plurality of projections.

5. The process according to claim 4, wherein the coating layer is applied by depositing a composite material formed of polymeric particles dispersed in a metal matrix.

6. The process according to claim 5, wherein the metal matrix comprises a nickel and phosphorus alloy.

7. The process according to claim 5, wherein the polymeric particles are tetrafluoroethylene-based particles.

8. The process according to claim 4, wherein the coating layer is applied by galvanically depositing metallic chromium.

9. The process according to claim 5, wherein the depositing is carried out until the coating layer has a thickness ranging from 5 µm to 15 µm.

10. The process according to claim 1, wherein removing material by the laser comprises using a power ranging from 20 KW to 60 KW, a frequency ranging from 100 KHz to 300 KHz, and a speed ranging from 800 mm/s to 1500 mm/s.

11. A process for producing a tyre for vehicle wheels, comprising:
    building a green tyre, and
    moulding and vulcanising the green tyre in the mould of claim 1.

* * * * *